(12) United States Patent
Andersson et al.

(10) Patent No.: US 11,514,789 B2
(45) Date of Patent: Nov. 29, 2022

(54) ILLUMINATION-BASED OBJECT TRACKING WITHIN A VEHICLE

(71) Applicant: Arriver Software LLC, Novi, MI (US)

(72) Inventors: Stefan Andersson, Vargarda (SE); Annika Frida Linnea Larsson, Vargarda (SE); Carl-Johan Palsson, Vargarda (SE)

(73) Assignee: Arriver Software LLC, Novi, MI (US)

( * ) Notice: Subject to any disclaimer, the term of this patent is extended or adjusted under 35 U.S.C. 154(b) by 17 days.

(21) Appl. No.: 16/960,062

(22) PCT Filed: Jan. 7, 2019

(86) PCT No.: PCT/US2019/012554
§ 371 (c)(1),
(2) Date: Jul. 3, 2020

(87) PCT Pub. No.: WO2019/136384
PCT Pub. Date: Jul. 11, 2019

(65) Prior Publication Data
US 2021/0056849 A1  Feb. 25, 2021

Related U.S. Application Data (60) Provisional application No. 62/614,280, filed on Jan. 5, 2018.

(51) Int. Cl.
*G08G 1/16* (2006.01)
*B60W 30/08* (2012.01)
(Continued)

(52) U.S. Cl.
CPC .............. *G08G 1/16* (2013.01); *B60W 30/08* (2013.01); *B60W 50/14* (2013.01); *B60Q 9/008* (2013.01);
(Continued)

(58) Field of Classification Search
CPC ... G08G 1/16; B60Q 9/008; B60W 2050/146; B60W 2554/00; B60W 2554/80; B60W 30/08; B60W 50/14
See application file for complete search history.

(56) References Cited

U.S. PATENT DOCUMENTS 4,577,264 A  *  3/1986  Plumly .................... F21S 4/20
                                                      362/240
4,652,238 A      3/1987  Leavy
(Continued)

FOREIGN PATENT DOCUMENTS

DE         10033985        5/2001
DE      102013007141      12/2013
(Continued)

OTHER PUBLICATIONS

Mar. 28, 2019 PCT/US19/12554 Written Opinion (6 pgs).
(Continued)

*Primary Examiner* — Brian E Miller
(74) *Attorney, Agent, or Firm* — Arriver Software LLC (57) ABSTRACT

Systems and methods for providing illumination-based object tracking information within a host vehicle. In some embodiments, the system may comprise a remote object detection module and an illumination display pattern within the vehicle comprising one or more light sources defining a pattern. The illumination display pattern may be configured to dynamically change in accordance with one or more objects being detected and/or tracked by the remote object detection module to convey visible information to vehicle occupants regarding such object(s).

16 Claims, 8 Drawing Sheets

(51) Int. Cl.
  *B60W 50/14* (2020.01)
  *B60Q 9/00* (2006.01)
(52) U.S. Cl.
  CPC ... *B60W 2050/146* (2013.01); *B60W 2554/00* (2020.02); *B60W 2554/80* (2020.02)

(56) References Cited

U.S. PATENT DOCUMENTS

| | | | |
|---|---|---|---|
| 6,679,618 B1* | 1/2004 | Suckow | F21S 43/31 |
| | | | 362/35 |
| 8,098,171 B1* | 1/2012 | Szczerba | G08G 1/166 |
| | | | 340/905 |
| 9,090,205 B2* | 7/2015 | Nagaoka | B60Q 1/085 |
| 9,598,048 B2 | 3/2017 | Tokai-Rika-Denki-Seisakusho | |
| 9,771,021 B1* | 9/2017 | Lindsay | B60Q 1/38 |
| 10,414,338 B2* | 9/2019 | Hubbell | G08G 1/167 |
| 10,552,688 B2* | 2/2020 | Faber | B60Q 1/1423 |
| 10,723,264 B2* | 7/2020 | Fujisawa | B60Q 3/78 |
| 2002/0089420 A1* | 7/2002 | Martineau | F21V 31/00 |
| | | | 340/463 |
| 2004/0114921 A1* | 6/2004 | Braun | G02B 7/32 |
| | | | 396/661 |
| 2006/0028328 A1* | 2/2006 | Cresse | G01S 17/931 |
| | | | 340/435 |
| 2009/0187343 A1* | 7/2009 | Koch-Groeber | B60K 35/00 |
| | | | 701/301 |
| 2011/0089864 A1* | 4/2011 | Wasniewski | H05B 47/175 |
| | | | 315/295 |
| 2011/0115615 A1* | 5/2011 | Luo | H04N 13/239 |
| | | | 340/436 |
| 2012/0025964 A1* | 2/2012 | Beggs | B60Q 1/26 |
| | | | 340/435 |
| 2012/0093357 A1* | 4/2012 | Seder | B60W 30/095 |
| | | | 382/103 |
| 2014/0350836 A1* | 11/2014 | Stettner | G01S 7/489 |
| | | | 701/301 |
| 2015/0127212 A1* | 5/2015 | Chacon | B60Q 3/70 |
| | | | 701/32.4 |
| 2015/0314783 A1* | 11/2015 | Nespolo | B60W 50/14 |
| | | | 701/301 |
| 2016/0288709 A1* | 10/2016 | Nespolo | B60K 35/00 |
| 2016/0288766 A1 | 10/2016 | Jayasuriya et al. | |
| 2017/0043716 A1* | 2/2017 | Hoepner | G08G 1/095 |
| 2017/0253181 A1* | 9/2017 | Choi | B60K 35/00 |
| 2017/0296855 A1* | 10/2017 | Williamson | A62C 99/0081 |
| 2018/0126985 A1* | 5/2018 | Lee | B61L 15/0027 |
| 2018/0208111 A1* | 7/2018 | Lisseman | G02B 6/0088 |
| 2019/0351823 A1* | 11/2019 | Van Der Meijs | B60K 35/00 |
| 2019/0375397 A1* | 12/2019 | Bae | B62D 15/027 |
| 2019/0377341 A1* | 12/2019 | Choi | G05D 1/0088 |
| 2020/0031273 A1* | 1/2020 | An | G08G 1/166 |
| 2020/0361482 A1* | 11/2020 | Choi | B60W 50/14 |
| 2021/0056849 A1* | 2/2021 | Andersson | G08G 1/16 |
| 2021/0061164 A1* | 3/2021 | Kursar | G06V 20/58 |
| 2021/0070173 A1* | 3/2021 | Rogge | B60Q 3/74 |
| 2021/0197846 A1* | 7/2021 | Thakur | G01S 17/931 |
| 2022/0101019 A1* | 3/2022 | Cohen | B60W 60/0027 |

FOREIGN PATENT DOCUMENTS

| | | |
|---|---|---|
| EP | 1180454 | 2/2002 |
| EP | 3085583 | 10/2016 |
| WO | 1999049698 | 9/1999 |
| WO | 2011049913 | 10/2011 |
| WO | 2017209313 | 12/2017 |

OTHER PUBLICATIONS

Mar. 28, 2019 PCT/US19/12554 International Search Report (2 pgs).
WO 2017/209131 Vehicle Display Device and Vehicle, LG Electronics, Machine Translation (49 pgs).
DE 10033985 Free Microphone Holder, Paragon, Machine Translation (11 pgs).
WO 1999/049698 Method and Device for Operating a Microphone System, especially in a Motor Vehicle, Volkovagen Activa Gesellschaft Germany, Machine Translation (12 pgs).
DE 102013007141 Speech Input System for Motor Car, Daimler, Machine Translation, (13 pgs).

* cited by examiner

ILLUMINATION-BASED OBJECT TRACKING WITHIN A VEHICLE

CROSS-REFERENCE TO RELATED APPLICATIONS

This application claims the benefit of U.S. Provisional Patent Application No. 62/614,280, filed Jan. 5, 2018 and titled "ILLUMINATION-BASED OBJECT TRACKING WITHIN A VEHICLE," which is hereby incorporated herein by reference in its entirety.

SUMMARY

Many current vehicles track external objects, such as passing and/or adjacent vehicles, to provide a driver with an indication of such objects in order to avoid collisions. This information may be communicated to a driver, for example, by way of sounds. This need for conveyance of this information is likely to only become of more importance in the future and to be provided in alternative ways and/or to vehicle occupants other than the driver. For example, with the anticipated increase in use of autonomous vehicles and vehicles with shared control (driver assist systems), it may be useful to provide a means by which the vehicle can indicate to occupants other than the driver that external objects have been detected and are being tracked.

The present inventors have therefore determined that it would be desirable to provide systems and methods that overcome one or more of the foregoing limitations and/or other limitations of the prior art. In some embodiments, the inventive concepts disclosed herein may provide for a display of lights, such as LED lights, that may be used to convey various types of information about external objects being tracked by the vehicle. For example, in a specific example of a system according to some embodiments, a plurality of lights, such as one or more light strips and/or rope lights, may be positioned in the vehicle, such as in the ceiling of the vehicle, that may be configured to correlate with and/or provide a representative display of one or more external objects that have been identified and/or are being tracked by the host vehicle.

The positioning of the lights/illumination may correlate with the position of the object(s) being detected. Thus, for example, a light or light panel positioned relative to other lights towards the right side of the vehicle may correlate with an object detected on the right side of the vehicle, and so on. The granularity of the directional information may be increased or decreased as desired by increasing the number of lights and/or by limiting the length of the lights in a light tube or strip. Various types of other information may be conveyed to vehicle occupants with such illumination, such as, for example, distance of identified objects, types/classes of identified objects, and/or sizes of identified objects by way of, for example, variation in colors, intensity, duration, flashing patterns, number of lights and/or length/size of illumination, etc., as described in greater detail below. Other means may be used in combination with such lights/illumination, if desired, in order to convey additional information, such as audible, visual, and/or tactile (e.g., providing a vibration sensation) means.

In a more particular example of an object detection and/or tracking system within a host vehicle, the system may comprise a remote object detection module, which may comprise, for example, a RADAR sensor, a LIDAR sensor, a camera, and/or other suitable remote object detection and/or tracking sensors, or a combination of suitable sensors. The system may further comprise an illumination display pattern comprising one or more light sources, such as LEDs (preferably a plurality of light sources) defining a pattern within the cabin of the host vehicle. In preferred embodiments, the pattern may be readily visible to occupants in the vehicle other than just the driver. In some such embodiments, the pattern may be positioned to be readily visible to all vehicle occupants, such as positioned within the ceiling of the vehicle and/or around the perimeter of the interior of the vehicle. The illumination display pattern may be configured to dynamically change in accordance with one or more objects being detected and/or tracked by the remote object detection module to convey visible information to vehicle occupants regarding such object(s). For example, in some embodiments, the illumination display pattern may be configured to dynamically change so as to convey information about the direction, classification, size, distance, perceived threat, or the like.

When used in connection with autonomous vehicles, it is contemplated that some embodiments may be configured to, either manually or automatically, change operation of the display when the vehicle enters and/or exits autonomous mode. For example, the vehicle may be configured to make the illumination display active when the vehicle is operating in autonomous mode and either turn off or change operation (such as serving as background lighting) when autonomous mode is inactive. The illumination display may also be used to signal to an occupant, such as the driver, when attention is required for some reason.

In a more specific example of a method for providing illumination-based remote object tracking within a host vehicle, the method may comprise detecting a remote object using one or more remote object sensors, such as RADAR sensors, LIDAR sensors, cameras, or the like, and illuminating at least a portion of a light display within a host vehicle in response to detecting the remote object. Movement of the remote object may then be tracked such that, in some embodiments, data indicative of movements of the remote object relative to the host vehicle is generated. The light display may be illuminated and/or altered based upon movement of the remote object to allow an occupant of the host vehicle to at least generally assess at least one of a location and a direction of movement of the remote object relative to the host vehicle.

In some implementations, the light display may comprise a plurality of adjacent lights arranged in a pattern within the host vehicle. In some such implementations, the light display may comprise a plurality of adjacent lights arranged in a concentric pattern. In some such implementations, the light display may be positioned about a periphery of a ceiling of a cabin of the host vehicle.

In some implementations, the step of illuminating at least a portion of a light display may comprise changing an illumination of a first portion of the light display. The first portion of the light display may be positioned adjacent to a side of the host vehicle facing the remote object. The step of changing the light display may comprise changing an illumination of a second portion of the light display. The second portion of the light display may be positioned closer to a line between a selected portion of a cabin of the host vehicle, such as a center or at least centrally located portion of the cabin, and an updated location of the remote object than a line between the selected portion of the cabin of the host vehicle and a previous location of the remote object.

In another example of a method for providing illumination-based remote object tracking within a host vehicle, the method may comprise detecting a remote object using one or more remote object sensors and illuminating a first portion of a light display within a cabin of a host vehicle in response to detecting the remote object. Relative movement of the remote object may be tracked from a first location to a second location with respect to the host vehicle and a second portion of the light display may be illuminated (such as actuating or altering the illumination) in response to detecting movement of the remote object to the second location. The second portion of the light display may be more closely aligned with the second location relative to a center of the cabin than the first location relative to the center of the cabin.

In some implementations, the light display may be positioned about the periphery of the cabin of the host vehicle, such as concentrically positioned about the periphery of the cabin of the host vehicle or, even more specifically, concentrically positioned about the periphery of a ceiling of the cabin of the host vehicle.

In some implementations, the step of illuminating a second portion of the light display in response to detecting movement of the remote object to the second location may comprise increasing an intensity of the second portion of the light display, changing a color of the second portion of the light display, and/or changing an illumination pattern of the second portion of the light display.

Some implementations may further comprise classifying the remote object as one of a plurality of distinct object types and/or modifying the light display according to a classified object type of the remote object. For example, the step of modifying the light display according to a classified object type of the remote object may comprise changing a color of at least a portion of the light display and each of a plurality of colors may be associated with a distinct object type.

In an example of a system for providing illumination-based tracking of remote objects from within a host vehicle, the system may comprise one or more environmental sensors, such as RADAR sensors, LIDAR sensors, cameras, and the like, configured to generate remote object data associated with remotely-detected objects relative to a host vehicle. The system may further comprise a tracking light display comprising one or more lights positioned to illuminate within a cabin of the host vehicle. The system may further comprise a remote object light tracking translation module configured to receive remote object data from the one or more environmental sensors, correlate the remote object data with the tracking light display, and transmit instructions to the tracking light display to cause the tracking light display to change illumination within the host vehicle according to at least one of a location, a direction of movement, an object type, and a distance of remotely-detected objects relative to the host vehicle.

In some embodiments, the tracking light display may define a closed-loop pattern, which may be in the form of a light strip, such as a 360-degree light strip positioned within a ceiling of the host vehicle.

In some embodiments, the remote object light tracking translation module may be configured to classify remotely-detected objects and may further be configured to change illumination of the tracking light display within the host vehicle according to a detected object classification of a remotely-detected object. In some such embodiments, the remote object light tracking translation module may be configured to adjust a color of at least a portion of the tracking light display according to the detected object classification of the remotely-detected object.

The remote object light tracking translation module may be configured to transmit instructions to the tracking light display to cause the tracking light display to change illumination within the host vehicle according to a distance of remotely-detected objects relative to the host vehicle by at least one of changing a color and a flashing pattern of the tracking light display.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to host vehicle displays for conveying information about external objects being tracked by the host vehicle. For example, in some embodiments, a host vehicle object tracking system may comprise one or more light sources preferably positioned in the cabin of the vehicle. The one or more light sources may be coupled with a remote object detection module, which may comprise, for example, a RADAR module, a LIDAR module, a camera, or the like, configured to obtain environmental data relating to objects adjacent to the host vehicle. It is contemplated that other means for detecting or being informed of remote objects in the vicinity of a host vehicle, such as V2X (vehicle to vehicle or vehicle to infrastructure communication systems) may be used in some embodiments. The system may be configured to use information obtained by the remote object detection module and/or information otherwise obtained, such as via V2X systems, to program operation of the one or more light sources within the cabin to convey useful information to vehicle occupants regarding the identified and/or tracked objects.

For example, in some embodiments, a plurality of lights may be positioned adjacent to one another in the ceiling of the vehicle cabin. Such lights may, in some embodiments, extend in a circle or other closed loop pattern (such as a rectangle, oval, etc.) to allow for 360-degree object visualization. In some embodiments and implementations, this pattern may comprise a concentric pattern that may be centered on a particular region of the host vehicle, such as a center or at least substantially central region of the vehicle so that lights in every direction may be indicative of a current position of a remotely-detected object, such as another vehicle or pedestrian, relative to the center of the vehicle.

Thus, upon detecting an object using the remote object detection module, one or more lights may be illuminated based upon the current position of the object. For example, if a tracked vehicle is approaching from behind the host vehicle, one or more lights positioned closer to the location of the target and/or relative to the other lights in the illumination display towards the rear of the vehicle may be illuminated. Similarly, if a tracked vehicle is identified in a blind spot to the left of the host vehicle, one or more lights positioned relative to the other lights towards the left side of the host vehicle may be illuminated. For example, as a target approaches, enters, and passes through the blind spot zone, the lights may be illuminated from the rear, as the target enters the blind spot zone of interest, the lights may increase in intensity and/or color and as the target moves though the zone of interest and the lights illuminated may move from the rear portion of the display to the front and finally, as the target exits the zone of interest, the light at the front or, in some embodiments, all lights in the display, may turn off.

In preferred embodiments, the visualization system is dynamic. Thus, with reference to one of the examples previously raised, if a tracked vehicle is approaching from behind the host vehicle and then moves to either the left or right side of the host vehicle in a passing maneuver, the one or more rearward lights may be turned off in favor of one or more lights on the side of the vehicle corresponding with the side adjacent to which the tracked vehicle is passing.

The granularity of the information being conveyed may also vary as desired to increase the information being provided. For example, although it is contemplated that some embodiments may comprise only one light per side of the vehicle, other embodiments may comprise a plurality of lights, perhaps even dozens, that correspond to each vehicle side. In this manner, an occupant may be able to glean not just whether a tracked vehicle or other object is behind the host vehicle, but also the direction of the tracked vehicle/object behind the host vehicle. Thus, for example, given sufficient granularity of the cabin illumination display, a vehicle occupant may be able to determine whether an approaching vehicle is directly behind the host vehicle, in a left adjacent lane, a right adjacent lane, etc.

Although preferred embodiments may comprise an illumination display in the ceiling of the vehicle cabin, various other alternatives are possible and contemplated by the present disclosure. For example, lights may instead, or additionally, be positioned within vehicle doors, a center console, the floor of the vehicle cabin, and/or within one of the vehicle pillars.

Various other types of information may be conveyed by the illumination systems of other contemplated embodiments. For example, some embodiments may convey information about the distance of tracked objects from the host vehicle. It is contemplated that this information may be conveyed in various ways, either using the illumination or using other stimuli. For example, in some embodiments, the intensity of the light being displayed may be correlated with the distance of the tracked object. Thus, for example, higher intensity may correlate with decreased distance from the host vehicle.

As another example, some embodiments may comprise a plurality of rows of lights. In embodiments providing 360-degree tracking, such rows may be arranged parallel, or at least substantially parallel, to one another in a closed loop pattern. Thus, in some embodiments, the distance of the lights from the center of the illumination pattern may correlate with the distance of the tracked object from the host vehicle. For example, as a tracked vehicle approaches the host vehicle from behind, one or more lights may be illuminated and, as the tracked vehicle gets closer, the lights furthest from the center of the pattern may turn off and lights closer to the center may illuminate to indicate to vehicle occupants that the tracked vehicle is approaching.

In some embodiments, a plurality of lights in adjacent rows may illuminate such that the closer lights (closer to the center) remain illuminated and the more distant lights are turned off as the tracked object approaches. In other words, tracked objects may correlate with lines or other elongated shapes that decrease (or, in other embodiments, increase) in length as the distance to the host vehicle decreases. In addition, as previously mentioned, such lines, shapes, or other illumination patterns may also vary dynamically in accordance with the direction of detected objects. Thus, the exemplary pattern referenced above with lines generated by concentric rows of lights may point directly to the rear of the vehicle and decrease in length as a tracked vehicle approaches and then such lines may change in direction by turning off or decreasing the intensity of lights pointing to the rear and turning on or increasing the intensity of lights pointing in other directions as the approaching target vehicle passes the host vehicle.

Still other information may be conveyed by the illumination display. For example, in some embodiments, the color of the lights may change and/or be correlated with the type of object detected, or at least the type of object suspected based upon available information. Thus, for example, object classification data from the RADAR or other remote object detection module/element may be used to identify suspected target vehicles with a particular color, say blue. Similarly, other suspected object classifications, such as pedestrians, may result in a different illumination color, say red. In this manner, vehicle occupants may be able to visualize not only the direction and/or distance of detected objects, but also the type of object that has been detected.

In some embodiments, the illumination display, such as the color and/or intensity of one or more lights of the display, may also, or alternatively, change in response to perceived threats. Thus, for example, in some embodiments, a light color of a detected object may change if the object is within a threshold distance from the host vehicle to indicate a potential threat of impact. Additional warning indicia, such as audible and/or tactile warnings, may also be used if desired.

As another contemplated possibility, some embodiments may be configured such that any object positioned within a perceived danger zone, which may but need not necessarily take into consideration the distance from the host vehicle, may result in a change in color of one or more light sources of the illumination display pattern. For example, when a target vehicle is within a perceived blind spot of the host vehicle, the color of the illumination display corresponding to the target vehicle may change from a color indicative of a benign target, such as green or blue, to a color indicative of a possible threat, such as red or yellow.

The degree of the perceived threat may also be taken into consideration and may result in further modification of the illumination display. This may take place in the form of, for example, changes to color, intensity, or other suitable display pattern characteristics. For example, a modest threat may result in a change to a first threat color, such as yellow, and a more severe threat may result in a change to a second threat color, such as red. Alternatively, the intensity of the light corresponding with a target may vary in accordance with the degree of the perceived threat.

As yet another option, in some embodiments, a pattern of flashing of the light(s) of the illumination display may be used to convey additional information. For example, in some embodiments, solid lights may change to flashing lights, or vice versa, when a target object is within a threshold distance of the host vehicle. Alternatively, flashing may be used to differentiate between various types of targets. For example, a detected pedestrian may initiate the display of a flashing light in a direction indicative of the location of the detected pedestrian.

Similarly, in some embodiments, the characteristics of the flashing may change to convey information. For example, the pulse rate of a flashing light display may increase as a target object decreases in distance, either in addition to or in lieu of the distance information indicators referenced above.

Figure 1:
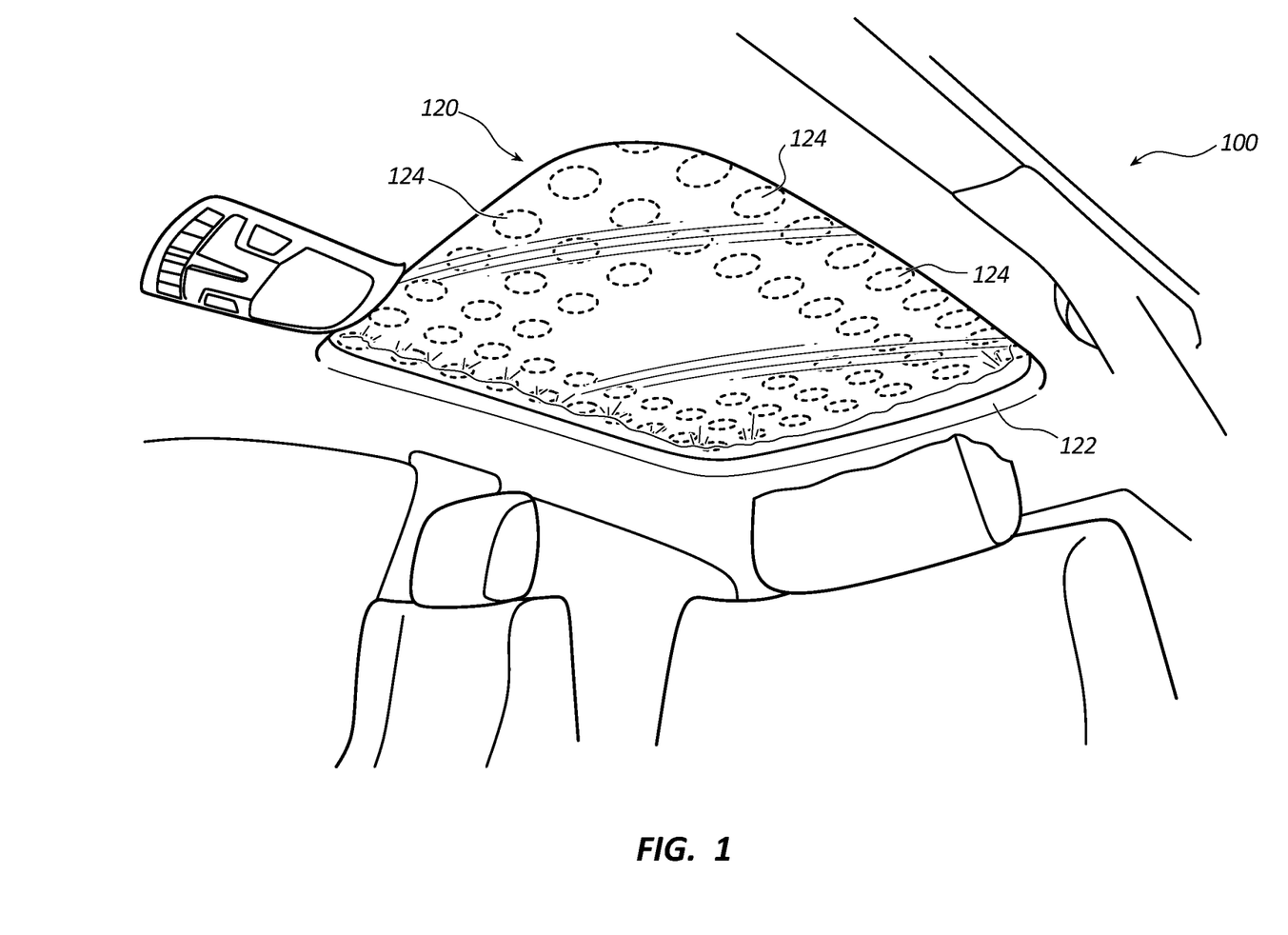
FIG. 1 depicts an example of an illumination-based object tracking system within a host vehicle according to some embodiments.

FIG. 1 depicts a ceiling of a vehicle 100 comprising an illumination cabin light display 120 according to some embodiments. As shown in this figure, a strip 122 of LED lights may extend about the perimeter of a depression, opening, or other feature formed in the ceiling of the vehicle cabin. As previously described, such lights may be communicatively coupled with a RADAR system or another remote object detection module and programmed to correlate information obtained from such system(s) with the pattern of lights displayed. Of course, this is but one example and a variety of alternative configurations are contemplated, many of which are described above, and should be considered within the scope of the present disclosure. As one specific example, rather than extend LED lights around the perimeter of the depression shown in FIG. 1, lights may instead, or additionally, extend into the depression itself. For example, a series of concentric circles, rectangles, or other shapes of lights may be positioned from the center of the ceiling of the vehicle cabin ceiling out towards, or even extending beyond, the perimeter of the depression/feature.

Thus, FIG. 1 also illustrates a series of adjacent lights 124 that are positioned concentrically about a center portion of the ceiling of the cabin of vehicle 100. Because these lights 124 extend in concentric rows, they may convey distance information in addition to directional information about remote objects being tracked. Although it is anticipated that most vehicles would likely incorporate either strip lights 122 or the individual lights 124 extending in concentric rows, light display 120 is shown with both for the sake of brevity. However, it is possible that a light display could incorporate both sets of lights as shown in FIG. 1.

FIGS. 2-6 depict a host vehicle 200 comprising an illumination-based object tracking display system according to another embodiment during use. The depicted illumination-based object tracking display system comprises light display 220 and may comprise various other elements as previously mentioned, such as microphones, cameras, sensors, software modules, and the like.

Figure 2:
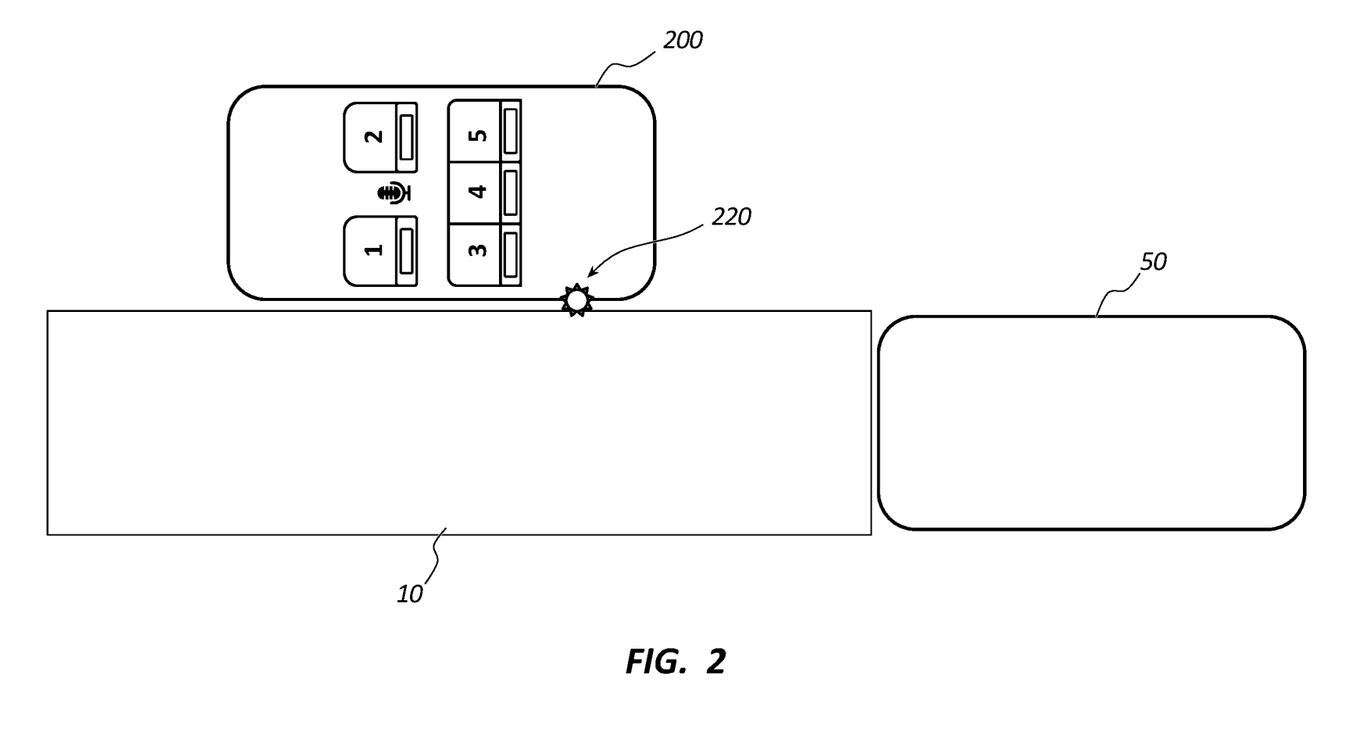
FIGS. 2-6 depict a host vehicle comprising an illumination-based object tracking display system according to another embodiment during use.

FIG. 2 shows the host vehicle 200 being approached by a target vehicle 50 from the driver side. A light of light display 220 positioned in the vehicle cabin that is positioned in proximity to the target vehicle relative to one or more other lights in the light display 220 may then illuminate to indicate that the target vehicle 50 is approaching. A zone of interest 10 is also shown in FIG. 2. Zone of interest 10 may comprise, for example, an expected blind spot for the driver of vehicle 200.

Figure 3:
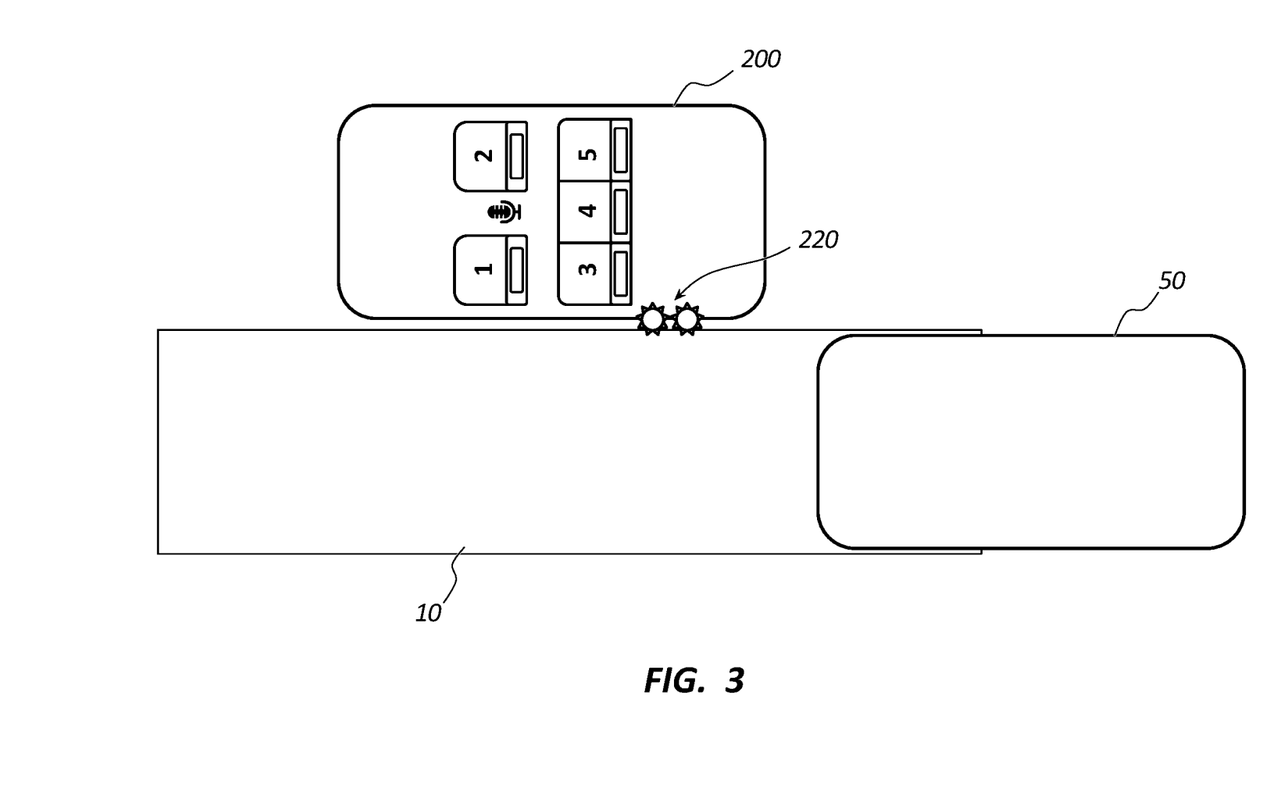

FIG. 3 shows the target vehicle 50 in closer proximity to the host vehicle 200. This movement may result in illumination of additional lights in light display 220, as shown in the figure, that may indicate the direction of the movement of target vehicle 50 to one or more vehicle occupants. Alternatively, a previous light associated with tracking of target vehicle 50 may be turned off or decreased in intensity in favor of a light more closely associated with the target vehicle 50 to provide this indication of movement if desired. In addition, in some embodiments, the color, intensity or other aspects of one or more of the lights in the light display 220 may change when the target enters a particular zone of interest, such as a blind spot 10. Thus, one or more of the lights shown in FIG. 3 may change color, intensity, or other characteristics (such as flashing) as soon as target vehicle 50 enters blind spot 10.

Figure 4:
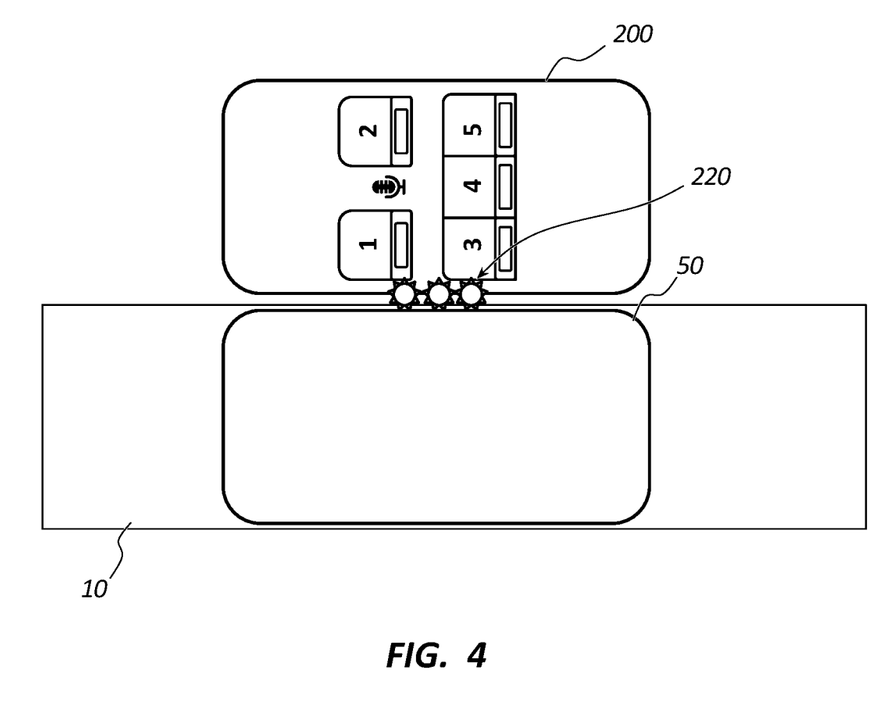
Figure 5:
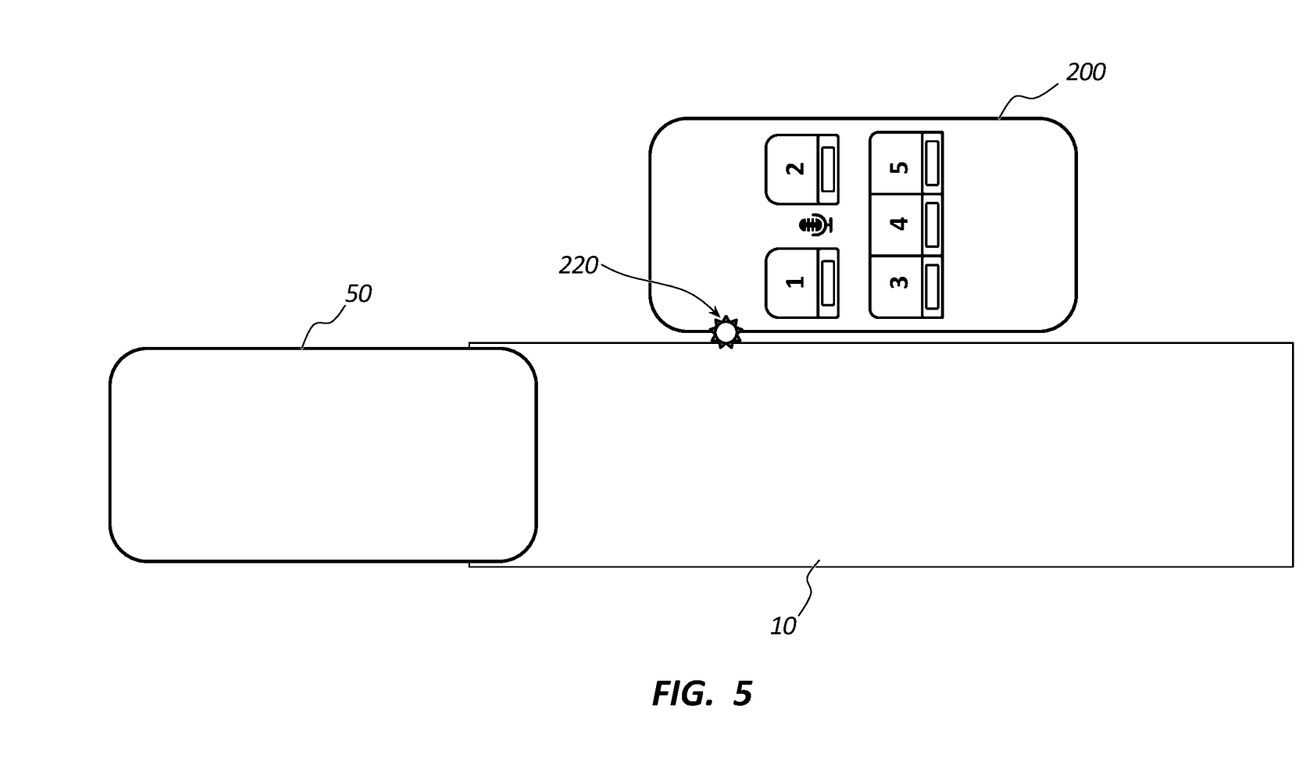
Figure 6:
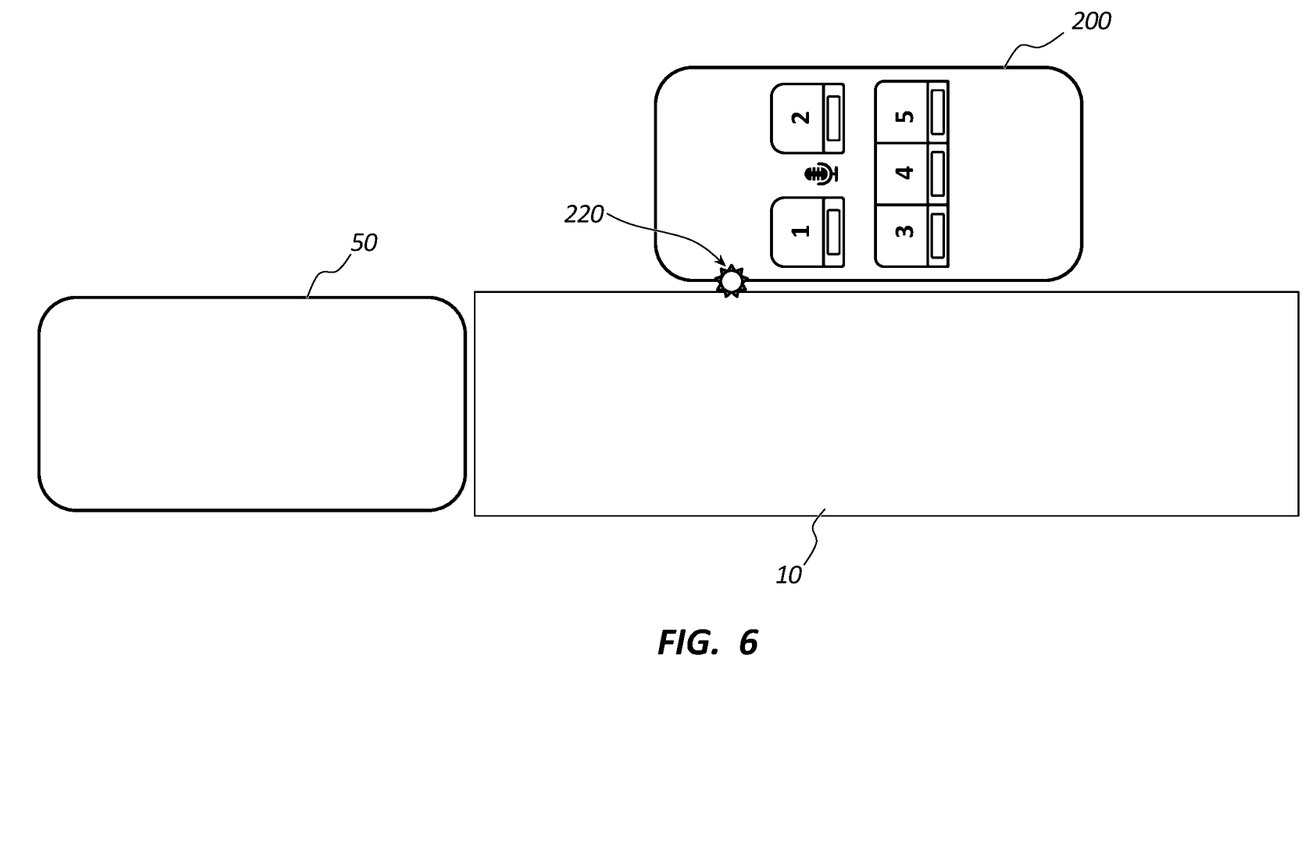

FIG. 4 shows additional lights of light display 220 being activated and previous lights turned off in response to the target vehicle 50 moving immediately adjacent to the host vehicle 200. Similarly, as shown in FIG. 5, as the target vehicle 50 begins to pass the host vehicle 200, one or more lights near the front of the host vehicle 200 are illuminated to indicate to occupants the relative position of the target vehicle 50 to the host vehicle 200. Finally, as shown in FIG. 6, after the target vehicle 50 has exited the defined zone of interest 10, one or more lights may either be turned off or may otherwise change, such as decreasing the intensity and/or changing color.

Figure 7:
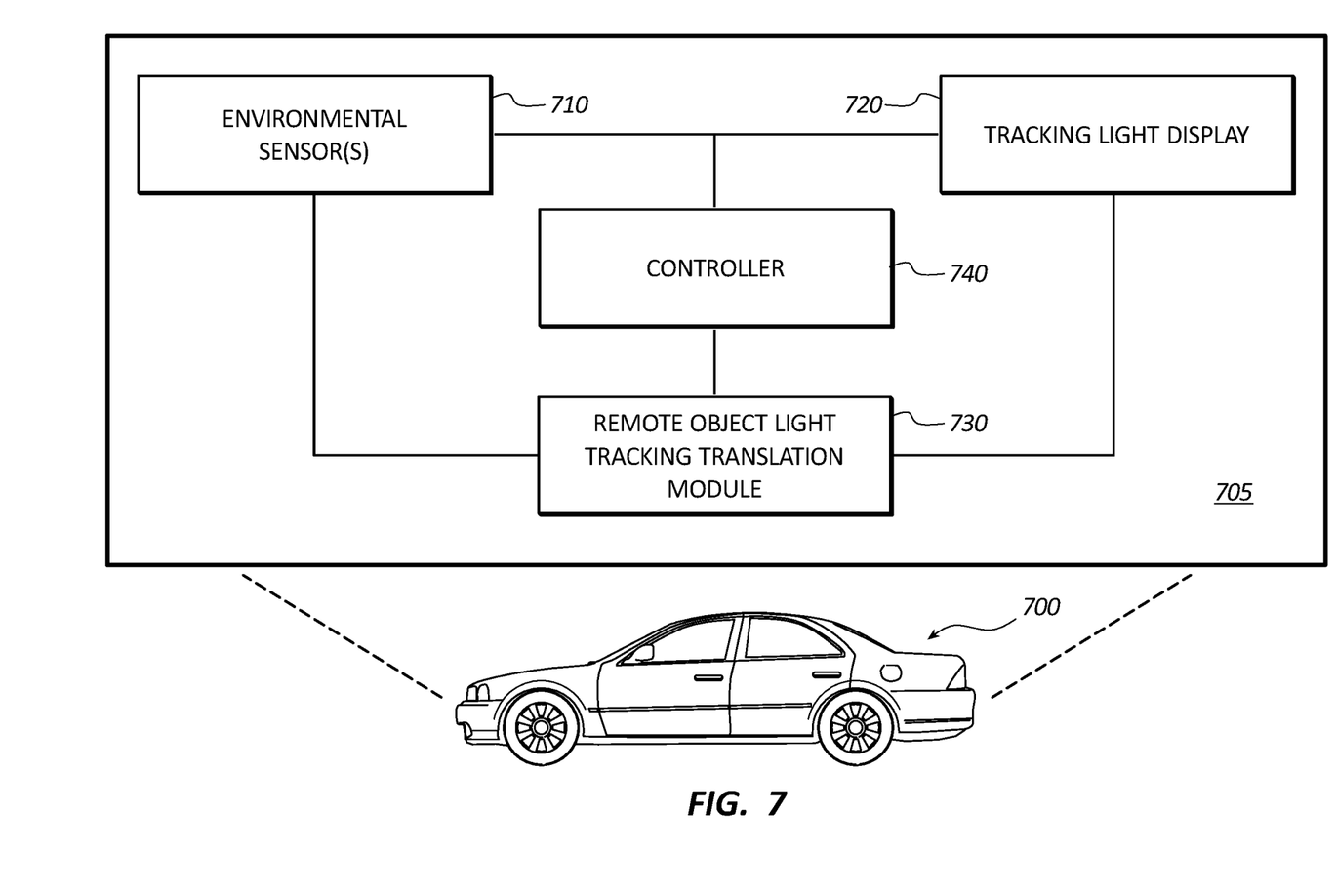
FIG. 7 illustrates a system for illumination-based object tracking within a host vehicle according to some embodiments.

FIG. 7 illustrates a host vehicle 700 comprising a system 705 for providing illumination-based tracking of remotely-detected objects from within the host vehicle according to some embodiments. As shown in this figure, system 705 may comprise one or more remote detectors or environmental sensors 710, such as RADAR sensors/modules, LIDAR sensors/modules, cameras, etc. Sensor(s) 710 may be configured to receive sensed data from remote objects, such as other vehicles, pedestrians, bicycles, and/or stationary objects that may be within a tracking vicinity of the host vehicle 700.

A tracking light display 720 may also be provided, which preferably provides one or more lights and/or light regions that are configured to illuminate the cabin of host vehicle 700. As previously mentioned, tracking light display 720 may comprise a 360-degree light strip or another preferably concentric light display comprising one or more lights, such as LED lights, that may extend about a region of a cabin of host vehicle 700 to facilitate providing information to vehicle occupants regarding remotely-tracked objects. Thus, in some preferred embodiments, tracking light display 720 may comprise a plurality of adjacent lights, which may be arranged in a light strip if desired, that extends about a periphery of the ceiling of the cabin of host vehicle 700.

Each light or portion of light display 720 may thereby correspond with a particular direction relative to the host vehicle 700. Thus, for example, lights adjacent to a right side of the vehicle may indicate the presence of a remotely-identified and/or tracked object on the right side of the host vehicle 700 to vehicle occupants, etc. Various other embodiments are contemplated, however, including embodiments in which light display 720 may be positioned along doors, floor panels, seats, and the like. The number of individual lights and/or light portions included in light display 720 may vary as desired, for example, in accordance with the desired granularity of the directional information of remote objects provided thereby.

As also previously mentioned, in some embodiments, various additional types of information may be provided by light display 720, which may be conveyed in a variety of ways, such as by providing different colors of illumination, which colors may correspond with a particular type of remote object, threat level and/or proximity of remote object, and the like, by providing different blinking/flashing patterns, and/or by providing different light intensities, for example.

System 705 may further comprise a remote object light tracking translation module 730. Module 730 may be configured to receive data from sensor(s) 710, which data may comprise directional data, distance data, speed/velocity data, size/dimensional data, feature-driven data, or other data used to detect, track, and/or classify remote objects. Module 730 may correlate this remote object data with the light display 720 and transmit instructions to light display 720 to cause light display 720 to change illumination within host vehicle 700 according to, for example, one or more of a location, a direction of movement, a speed/velocity, an object type/classification, and a distance of remotely-detected objects relative to the host vehicle 700.

For example, in some embodiments, module 730 may be configured to illuminate a portion of light display 720 most closely aligned with and/or in proximity to a direction of a remote object. As the remote object moves with respect to the host vehicle 700, module 730 may be configured to change the illumination pattern to convey information about this movement to vehicle occupants, such as by dimming or turning off a previous portion of the light display 720 and then brightening or otherwise illuminating a subsequent portion of the light display 720.

Module 730 may derive various other types of information from the remote object data, which may be processed and used to control other aspects of light display 720. For example, as previously mentioned, distance data, object type data, velocity/speed data, etc, may be processed by module 730 to modify color, light intensity, flashing/blinking patterns, etc.

In some embodiments, module 730 may be configured to simultaneously track and provide illumination-based information to vehicle occupants about multiple remote objects. In other embodiments, module 730 may be configured to only track a single remote object at a time. In some such embodiments, for example, module 730 may be configured to prioritize incoming data for a particular object according to a hierarchy, which may be based on, for example, proximity, threat level, object type, or another suitable parameter. For example, in some embodiments, module 730 may be configured to alter the illumination provided by light display 720 if the object being tracked is within a particular zone of interest, such as a blind spot of the vehicle. Thus, for example, objects within this zone may result in brighter illumination, flashing lights, and/or illumination of a different color.

A controller 740 may be provided in order to allow for processing of data from sensor(s) 710 and/or any of the various modules of system 700 described herein. As used herein, the term controller refers to a hardware device that includes a processor and preferably also includes a memory element. The memory may be configured to store one or more of the modules referred to herein and the controller 740 and/or processor may be configured to execute the modules to perform one or more processes described herein.

As used herein, the term controller refers to a hardware device that includes a processor and preferably also includes a memory element. The memory may be configured to store one or more of the modules referred to herein and the controller 740 and/or processor may be configured to execute the modules to perform one or more processes described herein.

As used herein, a software module or component may include any type of computer instruction or computer executable code located within a memory device and/or m-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices, Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Furthermore, embodiments and implementations of the inventions disclosed herein may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments and/or implementations may also be provided as a computer program product including a machine-readable storage medium having stored instructions thereon that may be used to program a computer (or other electronic device) to perform processes described herein. The machine-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions. Memory and/or datastores may also be provided, which may comprise, in some cases, non-transitory machine-readable storage media containing executable program instructions configured for execution by a processor, controller/control unit, or the like.

Figure 8:
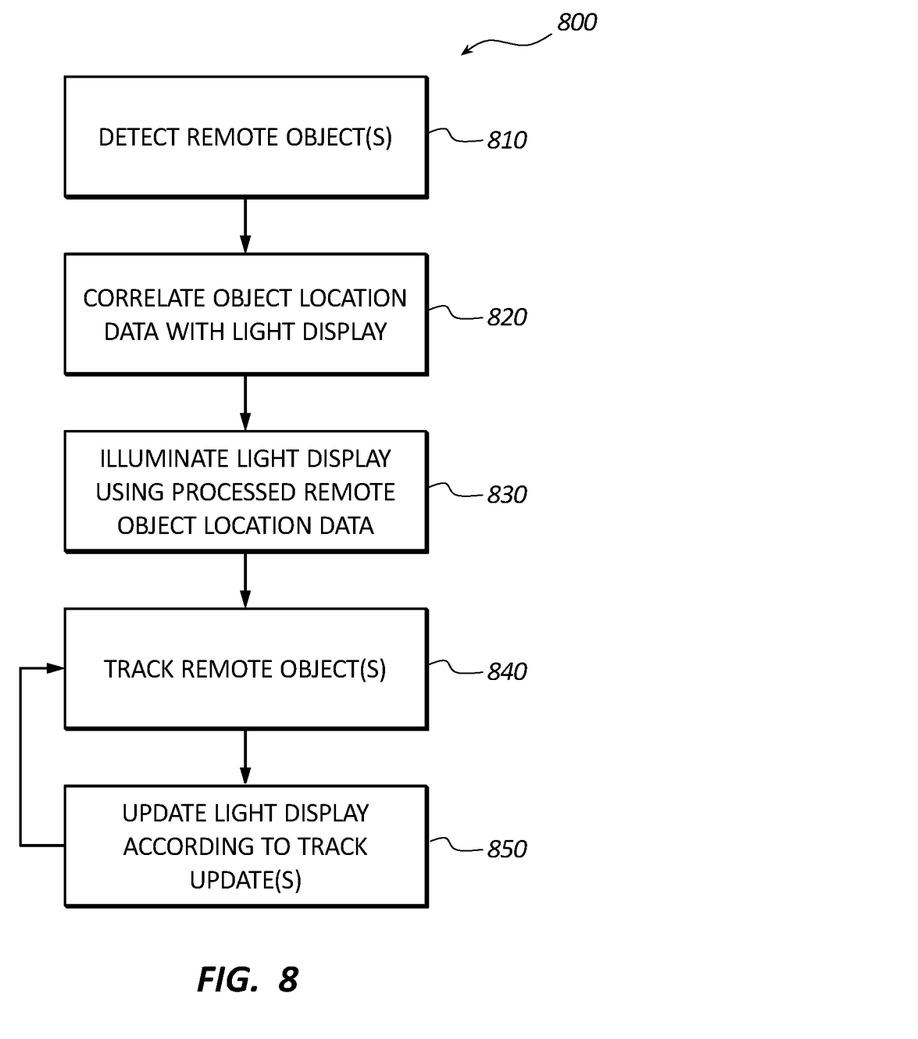
FIG. 8 is a flow chart depicting an example of a method for providing illumination-based tracking of remote objects from within a host vehicle according to some implementations.

FIG. 8 is a flow chart depicting an example of a method 800 for illumination-based remote object tracking from within a host vehicle according to some implementations. Method 800 may begin at 810 by detecting one or more remote objects from within a host vehicle. For example, RADAR sensors or other remote detectors/sensors/modules may be used to sense/detect characteristics/parameters of a remote object, such as length, width, area, speed, velocity, distance, etc.

Object location data from step 810 may then be correlated with one or more lights and/or portions of a light display at step 820. In some implementations, step 820 may comprise identifying one or more lights and/or portions of a tracking light display that correspond most closely with a current location of an object being tracked and/or identified in step 810. In some implementations, step 820 may comprise processing object location data from step 810 to link other parameters with one or more portions of a tracking light display, such as identifying an object type and linking the object type with a light color, intensity, or other light display pattern.

Step 830 may then comprise using the processed data from step 820 to selectively illuminate, turn off, and/or otherwise alter an illumination pattern in accordance with one or more objects identified by step 810 and/or being tracked. Thus, for example, if the processed data from step 820 indicates that a vehicle has been located within a predetermined proximity of a rear bumper of the host vehicle, a light on the tracking light display near the rear portion of the light display may be illuminated and, based upon the threshold proximity, may be made red and/or illuminated with a blinking pattern to indicate potential danger. If the object being detected is a pedestrian, a different color, intensity, or light pattern may be used to convey this information to vehicle occupants.

The one or more remote objects identified at step 810 may then be tracked at step 840 using technology available to those of ordinary skill in the art. This tracking data may then be processed and used to update the light display to reflect the updates to the object tracking. For example, if the object identified at step 810 has moved from the rear of the host vehicle to the side of the host vehicle, the light display may be altered to, for example, turn off or decrease the intensity of the rear portion of the light display and another portion of the light display adjacent to the side of the host vehicle closest to the tracked vehicle/object may be turned on or otherwise illuminated (increased in intensity, for example) at step 850. Although not shown in FIG. 8, it should be understood that step 820 or a similar processing/correlation step may take place as part of step 850 or before step 850.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A method for providing illumination-based remote object tracking within a host vehicle, the method comprising the steps of:
   detecting a remote object using one or more remote object sensors;
   illuminating at least a portion of a light display within the host vehicle in response to detecting the remote object wherein the light display comprises a plurality of adjacent lights arranged in a concentric pattern, wherein the light display is positioned about a periphery of a ceiling of a cabin of the host vehicle, wherein the light display comprises a plurality of adjacent, concentric rows of lights, wherein the plurality of adjacent, concentric rows of lights are configured to provide information about a distance of the remote object from the host vehicle to occupants of the host vehicle, and wherein the plurality of adjacent, concentric rows of lights are configured to illuminate in a pattern in which a distance of illuminated lights of the plurality of adjacent, concentric rows of lights from a center of the concentric pattern correlates with the distance of the remote object from the host vehicle;
   tracking movement of the remote object; and
   changing the light display based upon movement of the remote object to allow an occupant of the host vehicle to at least generally assess at least one of a location and a direction of movement of the remote object relative to the host vehicle.

2. The method of claim 1, wherein the step of illuminating at least the portion of the light display comprises changing an illumination of a first portion of the light display, wherein the first portion of the light display is positioned adjacent to a side of the host vehicle facing the remote object.

3. The method of claim 2, wherein the step of changing the light display comprises changing illumination of a second portion of the light display, wherein the second portion of the light display is positioned closer to a line between a selected portion of the cabin of the host vehicle and an updated location of the remote object than a line between the selected portion of the cabin of the host vehicle and a previous location of the remote object.

4. The method of claim 3, wherein the selected portion of the cabin comprises a centrally located portion of the cabin.

5. A method for providing illumination-based remote object tracking within a host vehicle, the method comprising the steps of:
   detecting a remote object using one or more remote object sensors;
   illuminating a first portion of a light display within a cabin of the host vehicle in response to detecting the remote object, wherein the light display comprises lights arranged in a closed loop pattern centered about an at least substantially central region of the vehicle and extending adjacent to a periphery of at least a portion of the cabin, wherein the light display comprises a plurality of adjacent, concentric rows of lights, wherein the plurality of adjacent, concentric rows of lights are configured to provide information about a distance of the remote object from the host vehicle to occupants of the host vehicle, and wherein the plurality of adjacent, concentric rows of lights are configured to illuminate in a pattern in which a distance of illuminated lights of the plurality of adjacent, concentric rows of lights from a center of the concentric pattern correlates with a distance of the remote object from the host vehicle;

tracking relative movement of the remote object from a first location to a second location with respect to the host vehicle; and illuminating a second portion of the light display in response to detecting movement of the remote object to the second location, wherein the second portion of the light display is more closely aligned with the second location relative to a center of the cabin than the first location relative to the center of the cabin.

6. The method of claim 5, wherein the step of illuminating the second portion of the light display in response to detecting movement of the remote object to the second location comprises at least one of increasing an intensity of the second portion of the light display and changing a color of the second portion of the light display.

7. The method of claim 5, further comprising:
classifying the remote object as one of a plurality of distinct object types; and
modifying the light display according to a classified object type of the remote object.

8. The method of claim 7, wherein the step of modifying the light display according to the classified object type of the remote object comprises changing a color of at least a portion of the light display, and wherein each of a plurality of colors is associated with a distinct object type.

9. A system for providing illumination-based tracking of remote objects from within a host vehicle, comprising:
one or more environmental sensors configured to generate remote object data associated with remotely-detected objects relative to the host vehicle;
a tracking light display comprising one or more lights positioned to illuminate within a cabin of the host vehicle, wherein the tracking light display comprises lights arranged in a closed-loop pattern comprising a plurality of concentric rows of lights, and wherein the plurality of concentric rows of lights are configured to illuminate in a pattern in which a distance of illuminated lights of the plurality of concentric rows of lights from a center of the closed-loop pattern correlates with a distance of a remotely detected object from the host vehicle; and
a remote object light tracking translation module configured to receive the remote object data from the one or more environmental sensors, correlate the remote object data with the tracking light display, and transmit instructions to the tracking light display to cause the tracking light display to change illumination within the host vehicle according to at least one of a location, a direction of movement, an object type, and a distance of the remotely-detected objects relative to the host vehicle.

10. The system of claim 9, wherein the tracking light display comprises a 360-degree light strip, and wherein the 360-degree light strip is configured to be positioned within a ceiling of the host vehicle.

11. The system of claim 9, wherein the remote object light tracking translation module is configured to classify the remotely-detected objects, and wherein the remote object light tracking translation module is further configured to change illumination of the tracking light display within the host vehicle according to a detected object classification of a remotely-detected object.

12. The system of claim 11, wherein the remote object light tracking translation module is configured to adjust a color of at least a portion of the tracking light display according to the detected object classification of the remotely-detected object.

13. The system of claim 9, wherein the remote object light tracking translation module is configured to transmit instructions to the tracking light display to cause the tracking light display to change the illumination within the host vehicle according to the distance of remotely-detected objects relative to the host vehicle by at least one of changing a color and a flashing pattern of the tracking light display.

14. The system of claim 9, wherein the tracking light display is positioned about a periphery of the cabin of the host vehicle.

15. The system of claim 14, wherein the tracking light display is concentrically positioned about the periphery of the cabin of the host vehicle.

16. The system of claim 15, wherein the tracking light display is concentrically positioned about the periphery of a ceiling of the cabin of the host vehicle.

* * * * *